US012621339B2

(12) United States Patent
Luttwak et al.

(10) Patent No.: US 12,621,339 B2
(45) Date of Patent: May 5, 2026

(54) SYSTEM AND METHOD FOR PROVIDING SECURITY POSTURE MANAGEMENT FOR AI APPLICATIONS

(71) Applicant: Wiz, Inc., New York, NY (US)

(72) Inventors: Ami Luttwak, Binyamina (IL); Alon Schindel, Tel Aviv (IL); Amitai Cohen, Kfar Saba (IL); Yinon Costica, Tel Aviv (IL); Roy Reznik, Tel Aviv (IL); Mattan Shalev, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/511,629

(22) Filed: Nov. 16, 2023

(65) Prior Publication Data

US 2025/0168193 A1      May 22, 2025

(51) Int. Cl.
*H04L 9/00* (2022.01)
*H04L 9/40* (2022.01)

(52) U.S. Cl.
CPC ...... *H04L 63/1441* (2013.01); *H04L 63/1416* (2013.01)

(58) Field of Classification Search
CPC ........................ H04L 63/1441; H04L 63/1416

USPC .......................................................... 726/23
See application file for complete search history.

(56) References Cited

U.S. PATENT DOCUMENTS

| | | | | |
|---|---|---|---|---|
| 10,164,982 B1 * | 12/2018 | Lazarovitz | .......... | H04W 12/122 |
| 12,277,216 B2 * | 4/2025 | Shemesh | ............ | G06F 9/45558 |
| 2022/0398316 A1 * | 12/2022 | Castrejon, III | ....... | G06F 21/552 |
| 2023/0269272 A1 * | 8/2023 | Dambrot | ............ | H04L 63/1408 726/22 |
| 2024/0119170 A1 * | 4/2024 | Xu | ........................... | G06N 3/08 |
| 2024/0134974 A1 * | 4/2024 | Moissinac | ............ | G06F 40/284 |
| 2024/0146747 A1 * | 5/2024 | Zaytsev | ............ | H04L 63/1416 |

* cited by examiner

*Primary Examiner* — Christopher J Brown
(74) *Attorney, Agent, or Firm* — M&B IP Analysts, LLC

(57) ABSTRACT

A system and method for determining an artificial intelligence (AI) security posture management (SPM) of a cloud computing environment. The method includes: inspecting the cloud computing environment for components of an AI pipeline; generating an AI pipeline representation based on a representation of each component of the AI pipeline in a security database; inspecting the cloud computing environment for a cybersecurity object associated with a component of the AI pipeline; analyzing the AI pipeline for a cybersecurity risk based on a result of inspecting the cloud computing environment for the cybersecurity object; and initiating a remediation action in the cloud computing environment in response to detecting the cybersecurity risk.

30 Claims, 7 Drawing Sheets

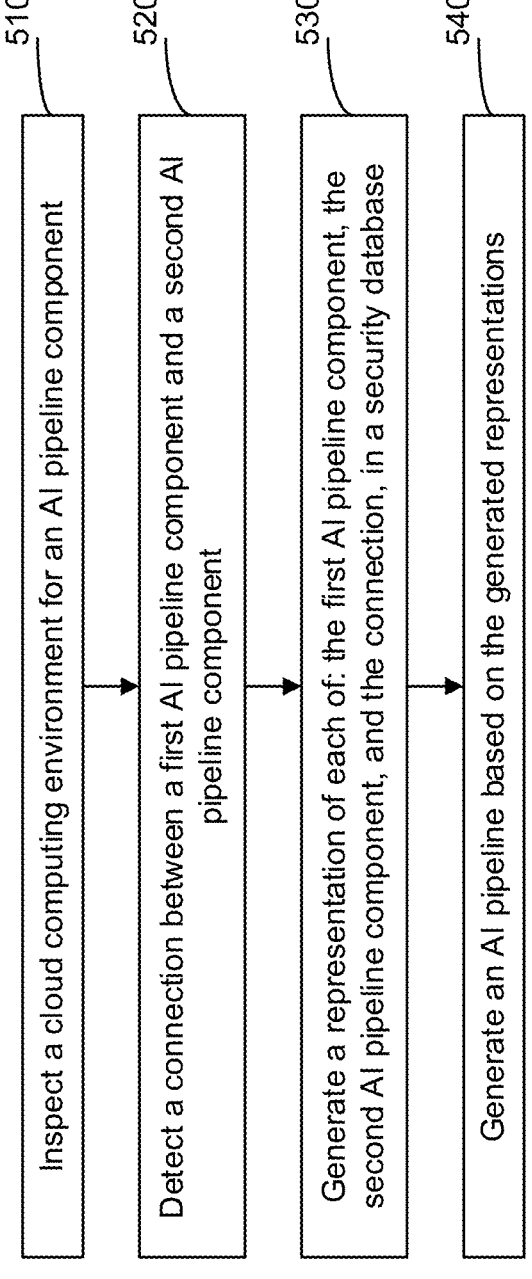

510 — Inspect a cloud computing environment for an AI pipeline component

520 — Detect a connection between a first AI pipeline component and a second AI pipeline component 530 — Generate a representation of each of: the first AI pipeline component, the second AI pipeline component, and the connection, in a security database 540 — Generate an AI pipeline based on the generated representations

FIGURE 5

SYSTEM AND METHOD FOR PROVIDING SECURITY POSTURE MANAGEMENT FOR AI APPLICATIONS

TECHNICAL FIELD

The present disclosure relates generally to security posture management (SPM), and specifically to security posture management of artificial intelligence (AI) pipelines in cloud computing environments.

BACKGROUND

Artificial intelligence (AI) applications are increasingly prevalent, as costs of computing hardware have plummeted significantly, and as AI models have improved their computational resource consumption.

This explosion in AI applications, with a rush to deploy AI solutions in various endeavors, presents new cybersecurity risks. Security teams lack knowledge and experience in AI systems, which can lead to vulnerabilities in implementations. AI systems are complex and ever-evolving, require new software tools that security teams may not be aware of, and also do not always have cybersecurity awareness about.

For example, an AI model may leak data, for example exposing sensitive data, secrets, etc. An AI model may be vulnerable to manipulation, such as by poisoning the training data. As with any rapidly evolving technology, the pace of evolution means that attackers can find an advantage over security teams.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting the cloud computing environment for components of an AI pipeline. Method may also include generating an AI pipeline representation based on a representation of each component of the AI pipeline in a security database. Method may furthermore include inspecting the cloud computing environment for a cybersecurity object associated with a component of the AI pipeline. Method may in addition include analyzing the AI pipeline for a cybersecurity risk based on a result of inspecting the cloud computing environment for the cybersecurity object. Method may moreover include initiating a remediation action in the cloud computing environment in response to detecting the cybersecurity risk. Other embodiments of this aspect include corresponding computer systems, apparatus, and computer programs recorded on one or more computer storage devices, each configured to perform the actions of the methods.

Implementations may include one or more of the following features. Method may include: analyzing the AI pipeline for a combined cybersecurity risk based on detecting a cybersecurity object and a component of the AI pipeline. Method where the cybersecurity object is a sensitive data, and the component of the AI pipeline is an exposed workload. Method may include: detecting the cybersecurity risk based on a combination of secondary cybersecurity risks. Method may include: detecting a database in the AI pipeline; determining that the detected database includes sensitive data; and generate an alert based on the sensitive data. Method may include: detecting a misconfiguration on a component of the AI pipeline; and initiating a remediation based on the detected misconfiguration. Method may include: detecting a principal deployed in the cloud computing environment as a component of the AI pipeline; detecting a permission associated with the principal through an identity and access management (IAM) service; and determining that the principal includes excessive permissions, based on the detected permission. Method may include: detecting an AI model stored on a component of the AI pipeline; determining that the AI model is associated with a cybersecurity risk; and initiating a remediation based on the cybersecurity risk. Method may include: determining that the AI model is vulnerable to a prompt injection, based on the associated cybersecurity risk. Method may include: detecting that an output of the AI model is directed to a predetermined sensitive system, the sensitive system being a component of the AI pipeline; determining that the AI model is configured to generate an executable instruction; and determining that the AI model is vulnerable to an output handling, in response to determining that the AI model is configured to generate the executable instruction. Method may include: detecting a secret in a component of the AI pipeline; and generating a cybersecurity risk assessment based on the detected secret. Method may include: detecting a potential attack path to a component of the AI pipeline. Method may include: detecting a network path between an external network and the component of the AI pipeline; and detecting the potential attack path based on the network path. Method may include: configuring an inspector to inspect a component of the AI pipeline for any one of: a vulnerability, an identity, a network exposure, a malware, a sensitive data, a secret, and any combination thereof. Implementations of the described techniques may include hardware, a method or process, or a computer tangible medium.

In one general aspect, non-transitory computer-readable medium may include one or more instructions that, when executed by one or more processors of a device, cause the device to: inspect the cloud computing environment for components of an AI pipeline. Medium may furthermore generate an AI pipeline representation based on a representation of each component of the AI pipeline in a security database. Medium may in addition inspect the cloud computing environment for a cybersecurity object associated with a component of the AI pipeline. Medium may moreover analyze the AI pipeline for a cybersecurity risk based on a result of inspecting the cloud computing environment for the cybersecurity object. Medium may also initiate a remediation action in the cloud computing environment in response to detecting the cybersecurity risk. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect the cloud computing environment for components of an AI pipeline. System may in addition generate an AI pipeline representation based on a representation of each component of the AI pipeline in a security database. System may moreover inspect the cloud computing environment for a cybersecurity object associated with a component of the AI pipeline. System may also analyze the AI pipeline for a cybersecurity risk based on a result of inspecting the cloud computing environment for the cybersecurity object. System may furthermore initiate a remediation action in the cloud computing environment in response to detecting the cybersecurity risk. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: analyze the AI pipeline for a combined cybersecurity risk based on detecting a cybersecurity object and a component of the AI pipeline. System where the cybersecurity object is a sensitive data, and the component of the AI pipeline is an exposed workload. System where the memory contains further instructions which when executed by the processing circuitry further configure the system to: detect the cybersecurity risk based on a combination of secondary cybersecurity risks. System where the memory contains further instructions which when executed by the processing circuitry further configure the system to: detect a database in the AI pipeline; determine that the detected database includes sensitive data; and generate an alert based on the sensitive data. System where the memory contains further instructions which when executed by the processing circuitry further configure the system to: detect a misconfiguration on a component of the AI pipeline; and initiate a remediation based on the detected misconfiguration. System where the memory contains further instructions which when executed by the processing circuitry further configure the system to: detect a principal deployed in the cloud computing environment as a component of the AI pipeline; detect a permission associated with the principal through an identity and access management (IAM) service; and determine that the principal includes excessive permissions, based on the detected permission. System where the memory contains further instructions which when executed by the processing circuitry further configure the system to: detect an AI model stored on a component of the AI pipeline; determine that the AI model is associated with a cybersecurity risk; and initiate a remediation based on the cybersecurity risk. System where the memory contains further instructions which when executed by the processing circuitry further configure the system to: determine that the AI model is vulnerable to a prompt injection, based on the associated cybersecurity risk. System where the memory contains further instructions which when executed by the processing circuitry further configure the system to: detect that an output of the AI model is directed to a predetermined sensitive system, the sensitive system being a component of the AI pipeline; determine that the AI model is configured to generate an executable instruction; and determine that the AI model is vulnerable to an output handling, in response to determining that the AI model is configured to generate the executable instruction. System where the memory contains further instructions which when executed by the processing circuitry further configure the system to: detect a secret in a component of the AI pipeline; and generate a cybersecurity risk assessment based on the detected secret. System where the memory contains further instructions which when executed by the processing circuitry further configure the system to: detect a potential attack path to a component of the AI pipeline. System where the memory contains further instructions which when executed by the processing circuitry further configure the system to: detect a network path between an external network and the component of the AI pipeline; and detect the potential attack path based on the network path. System where the memory contains further instructions which when executed by the processing circuitry further configure the system to: configure an inspector to inspect a component of the AI pipeline for any one of: a vulnerability, an identity, a network exposure, a malware, a sensitive data, a secret, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is an example flowchart of a method for detecting an artificial intelligence software pipeline, implemented in accordance with an embodiment.

DETAILED DESCRIPTION

Figure 1:
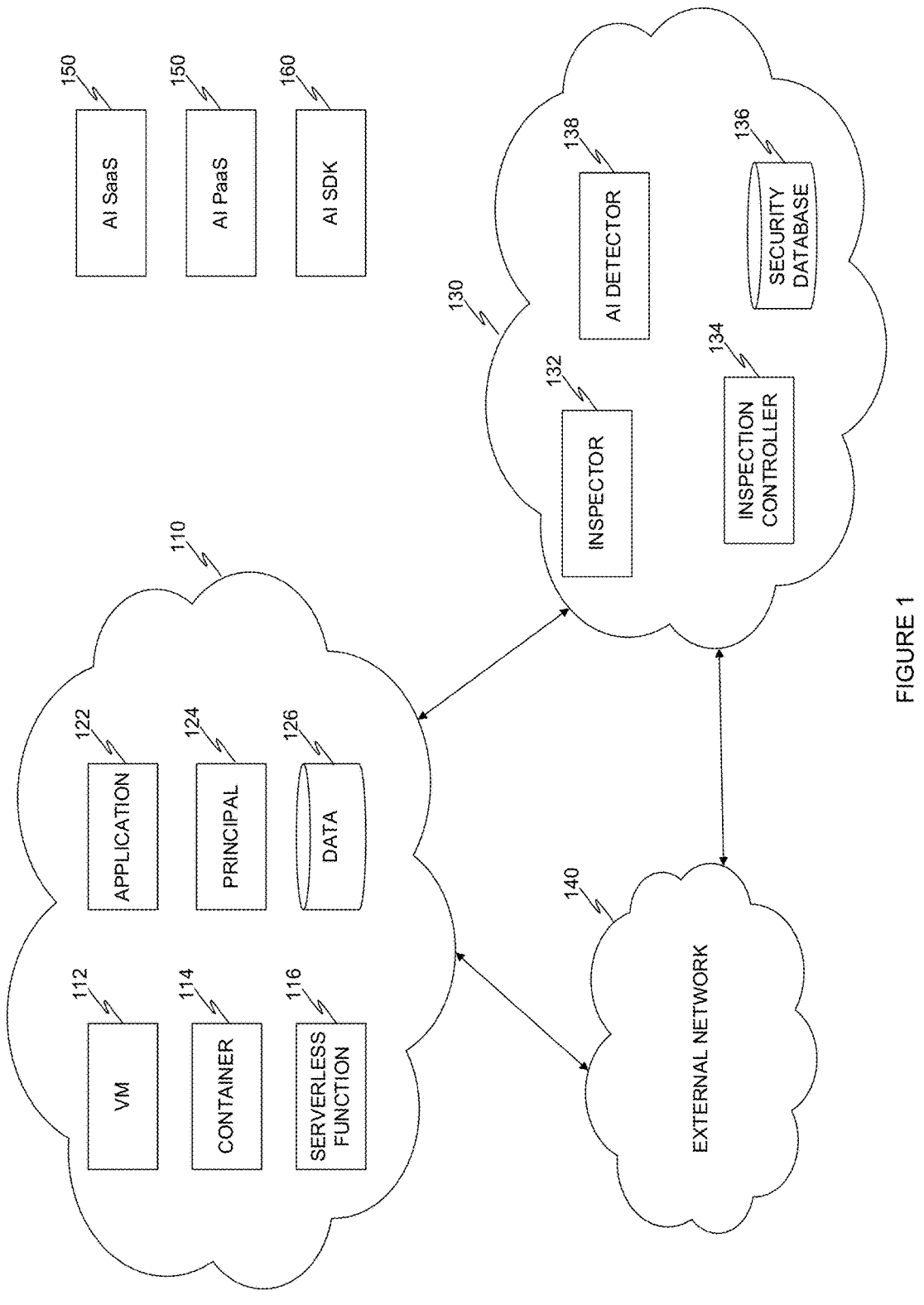
FIG. 1 is an example schematic illustration of a cloud computing environment for supporting an artificial intelligence (AI) pipeline, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating an AI pipeline. In an embodiment, an AI pipeline representation is generated. In some embodiments, the AI pipeline representation includes AI components detected across multiple cloud computing environments. In certain embodiments, the multiple cloud computing environments are not otherwise connected.

In some embodiments, cybersecurity risk analysis is performed on the AI pipeline. Performing a cybersecurity risk analysis, including detection of toxic combinations as explained below, allows to detect cybersecurity risks which exist through a pipeline, and do not necessarily appear to exist when only viewing a segregated view of a single cloud computing environment.

For example, AI models are often trained on data in a first environment (e.g., a development environment), and then deployed in a second environment (e.g., a production environment). Neither of these environments are discernably connected oftentimes, so when viewed individually, it seems the training data is isolated from the production environment.

However, the nature of AI models is that they can inadvertently expose data they are trained on by providing outputs based on that training data. Therefore, it is advantageous to analyze the AI pipeline as a whole, including all components, in order to determine cybersecurity risk.

FIG. 1 is an example schematic illustration of a cloud computing environment for supporting an artificial intelligence (AI) pipeline, utilized to describe an embodiment. In an embodiment, a cloud computing environment 110 includes cloud entities, such as resources, principals, and the like.

In certain embodiments, the cloud computing environment 110 is implemented as a tenant, as a virtual private cloud (VPC), as a virtual network (VNet), a combination thereof, and the like. In some embodiments, the cloud computing environment 110 is deployed on a cloud computing infrastructure, such as Amazon® Web Service (AWS), Google® Cloud Platform (GCP), Microsoft® Azure, and the like.

In an embodiment, a resource is a cloud entity which exposes hardware resources (e.g., provides access to a processor, a memory, a storage, a combination thereof, and the like), exposes services, exposes an application programming interface (API), a combination thereof, and the like.

In some embodiments, a principal is a cloud entity which is authorized to initiate actions in the cloud computing environment 110, authorized to act on a resource, a combination thereof, and the like.

For example, according to an embodiment, a principal is a user account, a service account, a role, a combination thereof, and the like. In some embodiments, a resource is a virtual machine, a software container, a serverless function, an application, a database, a combination thereof, and the like.

In certain embodiments, a virtual machine 112 is deployed in the cloud computing environment 110. In some embodiments, the virtual machine 112 is implemented as Oracle® VirtualBox®, for example. In an embodiment, the virtual machine 112 is associated with a disk (not shown).

In an embodiments, a software container 114 is deployed in the cloud computing environment 110. In some embodiments, the software container 114 is implemented utilizing a Kubernetes® Platform, a Docker® container engine, a combination thereof, and the like.

According to an embodiment, a serverless function 116 is deployed in the cloud computing environment 110. In certain embodiments, the serverless function 116 is implemented as an Amazon® Lambda® service.

In some embodiments, an application 122 is deployed in the cloud computing environment. In an embodiment, an application is deployed utilizing a resource, a plurality of resources, and the like. In some embodiments, an application 122 includes a software library, a software binary, an executable code, a combination thereof, and the like.

In an embodiment, the application 122 is a component of an artificial intelligence (AI) pipeline. According to an embodiment, an AI pipeline is utilized to provide a service utilizing an AI model. For example, in an embodiment, an AI pipeline includes software components, such as an AI model, a training data, an API, a combination thereof, and the like. In some embodiments, an AI pipeline includes resource components such as a serverless function 116, a software container 114, a virtual machine 112, a combination thereof, and the like.

For example, in an embodiment, an application 122 is hosted on a virtual machine 112. A serverless function 116 is configured to receive a prompt, which is then directed to an AI model, such as a large language model (LLM) to produce an output.

In an embodiment, the AI model is trained on a data set stored, for example, in a database 126. In some embodiments, an AI model is trained on a database 126 in a first cloud computing environment (e.g., a development environment), and the application 122 is deployed in a second cloud computing environment (e.g., a production environment). According to some embodiments, this presents a challenge, for example where the database 126 includes sensitive information which is used to train the AI model, but the data itself should not become exposed through use of the AI model.

In an embodiment, an AI model includes an artificial neural network (ANN), a recurrent neural network (RNN), a convolutional neural network (CNN), a generative adversarial neural network (GAN), a Bayesian network, a hidden Markov model, a large language model (LLM), a combination thereof, and the like.

In an embodiment, an AI pipeline includes resources, principals, and the like, which are utilized in providing a service based, for example, on an AI model. In an embodiment, a first component of the AI pipeline is connected to a second component of the AI pipeline, for example by a network policy allowing the first component to access the second component.

In some embodiments, the cloud computing environment 110 is accessible by an eternal network 140. In an embodiment, the external network 140 includes computing devices, user accounts, and the like, which are not affiliated with the cloud computing environment 110, but receive a service, access to a resource, access to an application, a combination thereof, and the like. According to an embodiment, the external network 140 is, for example, the Internet.

In certain embodiments, the cloud computing environment 110 is monitored for cybersecurity objects, threats, risks, and the like, by an inspection environment 130. In an embodiment, the inspection environment 130 is configured to monitor the cloud computing environment 110 for cybersecurity objects, threats, risks, combinations thereof, and the like.

In some embodiments, an inspector 132 is configured to inspect a workload of the cloud computing environment 110 for a cybersecurity object. An inspector 132 is implemented, in certain embodiments, as a resource, such as a virtual machine, a software container, a serverless function, a combination thereof, and the like. In some embodiments, it is advantageous to implement the inspector 132 as a node in software container, as this allows scaling of the inspection environment 130 to accommodate the inspection needs of the cloud computing environment 110.

In certain embodiments, an inspector 132 is configured to inspect a workload for a cybersecurity object such as a hash, a malware, a signature, an application, an operating system, a binary, a library, a computer code object, a code object of an infrastructure as code file, a registry file, a password stored as text (e.g., cleartext, plaintext, etc.), a certificate, a cryptographic key, a vulnerability, an exposure, a misconfiguration, a combination thereof, and the like.

For example, according to an embodiment, an inspector 132 is configured to detect a misconfiguration based on configuration rules. In an embodiment, a configuration rule is applied to a representation of a cybersecurity object, a representation of a workload, a representation of a principal, a combination thereof, and the like.

In an embodiment, an inspector 132 is configured to detect a component of an AI pipeline. In an embodiment, a component of an AI pipeline includes a model (e.g., stored as a file on a storage, a repository, and the like), a database, a training dataset, a serverless function configured to train the AI model using the training dataset stored on the database, an AI application, an AI application endpoint, an API, a combination thereof, and the like.

In certain embodiments, the inspector 132 is configured to detect a network path between an external network 140, and a component of the AI pipeline. For example, in an embodiment, a network path includes resources, applications, and the like, between the external network path 140, and the application 122. In some embodiments, where the network path exposes a resource, exposes data, and the like, to the external network, the network path is determined to be an exposure path.

In some embodiments, the inspector 132 is configured to query a cloud API to detect cloud entities, such as resources and principals, in the cloud computing environment 110. In certain embodiments, the inspector 132 is configured to query a Platform as a Service (PaaS) to detect an assistant, a list of assistant files, a list of runs belonging to a thread, a list of files associated with a principal, a list of models, a list of available AI models, metadata related to each AI model, a list of messages for a thread, an action, a function, a training dataset, a document, a training job, a thread, a combination thereof, and the like.

According to an embodiment, the inspector 132 is configured to inspect a network and detect network objects, such as resources deployed in a cloud computing environment 110. For example, in an embodiment, a network object is a server, a firewall, a web-access firewall (WAF), a load balancer, a gateway, a proxy server, a combination thereof, and the like.

In some embodiments, the inspector 132 is configured to detect identities deployed in the cloud computing environment 110. In an embodiment, an identity is a user account, a service account, a role, an email address, a security credential associated with an identity, a combination thereof, and the like.

In certain embodiments, the inspector 132 is configured to inspect a registry, a command-line interface (CLI), a PaaS, a SaaS, an SDK, a network, an IAM service, a resource, a combination thereof, and the like, to detect a cybersecurity object.

According to an embodiment, an inspector 132 is configured to inspect a first cloud computing environment (e.g., a production environment) and a second cloud computing environment (e.g., a development environment). This is advantageous as AI pipelines are often split among a plurality of computing environments. For example, according to an embodiment, an AI model is trained in a development environment, and deployed in a production environment.

In some embodiments, it is advantageous to generate a pipeline as a view which allows to see a complete AI pipeline through, and including, multiple cloud computing environments. This allows visibility into, for example, an AI model trained on sensitive data, which could potentially leak in a production environment, despite the sensitive data being actually stored in the development environment.

In an embodiment, the inspection environment 130 further includes an inspection controller 134. In some embodiments, the inspection controller 134 is configured to provision inspector workloads in response to detecting a demand for inspection workloads. In certain embodiments, the inspection controller 134 is configured to generate a copy, a clone, a snapshot, a combination thereof, and the like, in the cloud computing environment 110, in the inspection environment 130, and the like, based on a disk associated with a workload in the cloud computing environment 110.

In certain embodiments, it is advantageous to generate a clone of a disk, as a clone utilizes less resources than a snapshot, for example. In an embodiment, a clone is generated by generating a pointer to the same storage address of the original data, thereby providing instantaneous access to the 'cloned' disk. In certain embodiments, access to a snapshot is only provided after the snapshot process has completed generating the snapshot.

In an embodiment, the inspection environment 130 further includes a security database 136. In some embodiments, the security database 136 is configured to store a representation of the cloud computing environment 110, for example based on a predetermined data schema. In an embodiment, a unified data schema is utilized, including templates for example for representing a resource, representing a principal, representing an enrichment, representing a cybersecurity issue, a combination thereof, and the like.

In some embodiments, the security database 136 is implemented as a columnar database, a SQL database a non-SQL database, a table, a plurality of tables, a graph database, combinations thereof, and the like. For example, in an embodiment, a security database 136 is implemented as a graph database, such as Neo4j®.

In certain embodiments, the inspection environment 130 further includes an AI detector 138. In an embodiment, the AI detector 138 is configured to generate an AI pipeline. In some embodiments, an AI pipeline is a representation, for example stored in a security database 136. In an embodiment, the AI pipeline includes representations of AI components, and connections between the AI components.

For example, according to an embodiment, a dataset used for training an AI model is an AI component. In some embodiments, a dataset is determined to be used for training by detecting that a dataset stored in, for example, a storage bucket, is accessed by a serverless function configured to train an AI model. In an embodiment, the storage bucket is represented as a resource in the security database, and the representation of the storage bucket is further associated with the AI pipeline.

In certain embodiments, the AI detector 138 is configured to detect various AI components across multiple cloud computing environments. For example, in an embodiment, an AI model is trained in a first cloud computing environment (e.g., a development environment) and deployed in a second cloud computing environment (e.g., a production environment).

Therefore, in some embodiments, an AI pipeline includes components which are deployed in a plurality of cloud computing environments. In certain embodiments, the AI detector 138 is configured to detect that a component deployed in a first cloud computing environment is accessible by, or is configured to access, a component deployed in a second cloud computing environment.

In some embodiments, the cloud computing environment 110 is configured to access a service, access a platform, access a software development kit (SDK), and the like. For example, in an embodiment, the cloud computing environment 110 is configured to access an AI SaaS 150, an AI PaaS 160, an AI SDK 170, a combination thereof, and the like.

According to an embodiment, an AI SaaS 150 is, for example Google® TensorFlow®, and the like. In some embodiments, an AI PaaS 160 is, for example, OpenAI®, Hugging Face®, and the like.

Figure 2:
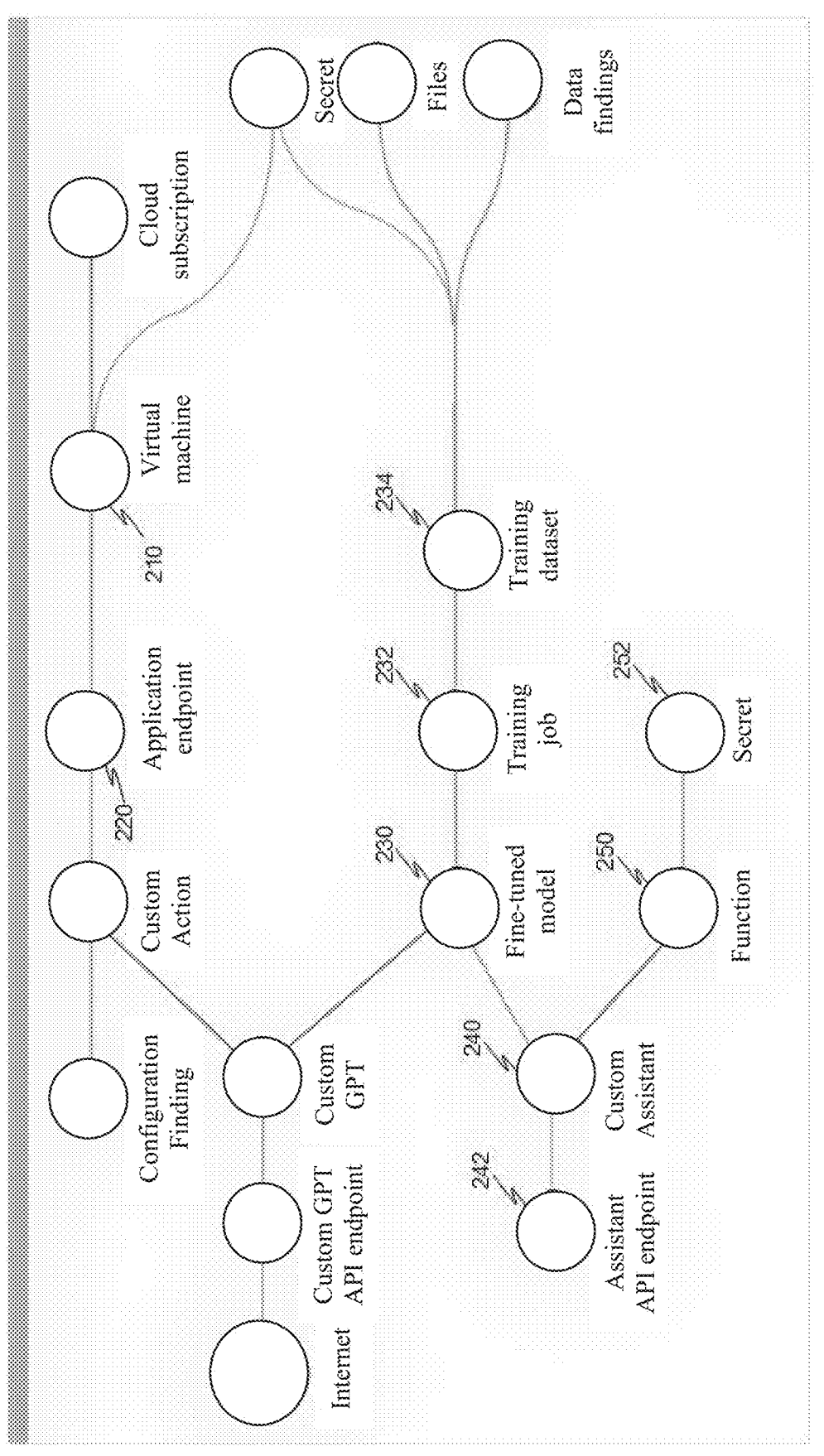
FIG. 2 is an example security graph representation of an AI pipeline, implemented in accordance with an embodiment.

FIG. 2 is an example security graph representation of an AI pipeline, implemented in accordance with an embodiment. In an embodiment, a security database is implemented as a graph database, based on a unified data schema. In some embodiments, the security database includes a plurality of nodes and connections between the nodes.

For example, in an embodiment, a node represents a resource, a principal, a cybersecurity object, a misconfiguration, a vulnerability, an exposure, a malware object, an enrichment, a remediation action, combinations thereof, and the like.

In some embodiments, a connection between nodes indicates a relationship between the objects represented by the nodes. For example, in an embodiment, a node representing an application 220 is connected to a node representing a virtual machine 210, indicating that the application represented by application node 220 is deployed on the virtual machine represented by the virtual machine node 220.

In an embodiment, a representation of a fine-tuned model 230 is generated in response to detecting a fine-tuned AI model. In some embodiments, detecting a fine-tuned model includes accessing an API of an AI SaaS provider, and pulling a list of AI models accessible by an account. In an embodiment, the account identifier is provided, for example, to an AI detector.

In certain embodiments, detecting a fine-tuned model includes detecting API calls in a networked environment directed to a known predefined AI SaaS, AI PaaS, combination thereof, and the like.

In an embodiment, a serverless function is utilized to implement a custom assistant application. In some embodiments, the serverless function is detected, for example by an inspector configured to detect virtual instances in a computing environment. In an embodiment, a representation of the serverless function is generated in a security database, for example as custom assistant node 240.

In an embodiment, an inspector is configured to detect that the custom assistant represented by the custom assistant node 240 accesses the fine-tuned model represented by fine-tuned model node 230. In some embodiments, the serverless function deploying the custom assistant includes an API through which the serverless function is configured to receive calls, represented by AI endpoint 242.

In certain embodiments, the serverless function is further configured to access a function, represented by function node 250, which in turn includes a secret, represented by secret node 252. In some embodiments, the serverless function is deployed in a production environment.

In an embodiment, a trainer is configured to train an AI model, such as a generative pre-trained transformer (GPT) model, into the fine-tuned model represented by the fine-tuned model node 230. In some embodiments, the trainer is implemented as a virtual instance in development environment, for example as a serverless function. In an embodiment, the trainer is represented by a training job node 232.

In certain embodiments, a first inspector is configured to detect the serverless function in the production environment (e.g., represented by the custom assistant node 240), and a second inspector is configured to detect the trainer (represented by the training job node 232) in the development environment.

In an embodiment, an AI detector is configured to detect a connection between the trainer and the serverless function (i.e., between the training job node 232 and the custom assistant node 240). For example, in an embodiment, the AI detector is configured to detect that the trainer is configured to store a trained AI model in a bucket, which is accessed by the serverless function.

Generating a representation including a connection between multiple computing environment to generate a pipeline is advantageous, as this allows to detect vulnerabilities, exposures, and the like, including risk combinations (e.g., vulnerability and exposure) which are not otherwise apparent when a representation includes only components of one computing environment, where a pipeline utilizes multiple components from multiple computing environments.

According to an embodiment, a trainer is configured to train an AI model using a training dataset, represented by training dataset node 234. In some embodiments, the training dataset is stored, for example as a file, a plurality of files, and the like, on a storage, such as a network-accessible storage device, a cloud based storage service, a combination thereof, and the like.

In certain embodiments, the training dataset includes sensitive data. In an embodiment, it is advantageous to maintain a separation between sensitive data in a development environment, and an application (such as the custom assistant, a custom GPT, etc.) in a production environment, where the application is exposed to an external network, such as the Internet.

For example, in an embodiment, an API endpoint (represented by custom GPT API endpoint 262) is configured to receive an input from a user account over an external network (i.e., external to where the custom GPT is deployed). In some embodiments, the API endpoint is an endpoint for a custom GPT (represented by custom GPT node 260). In an embodiment, the custom GPT is configured to utilized a fine-tuned model (represented by fine-tuned model node 230).

In some embodiments, the custom GPT is deployed in a production environment, while the trainer is deployed in a development environment. Representing the pipeline allows to detect a cybersecurity risk which is not apparent when each computing environment is viewed individually. In this example, the custom GPT is exposed to an external network (i.e., represented by the Internet node 270). In an embodiment, the custom GPT is configured to utilize the fine-tuned AI model which utilizes a training dataset that includes sensitive data.

In certain embodiments, this AI pipeline indicates a cybersecurity risk of exposing sensitive data through the custom GPT, by utilizing the fine-tuned model trained on the sensitive data.

Figure 3:
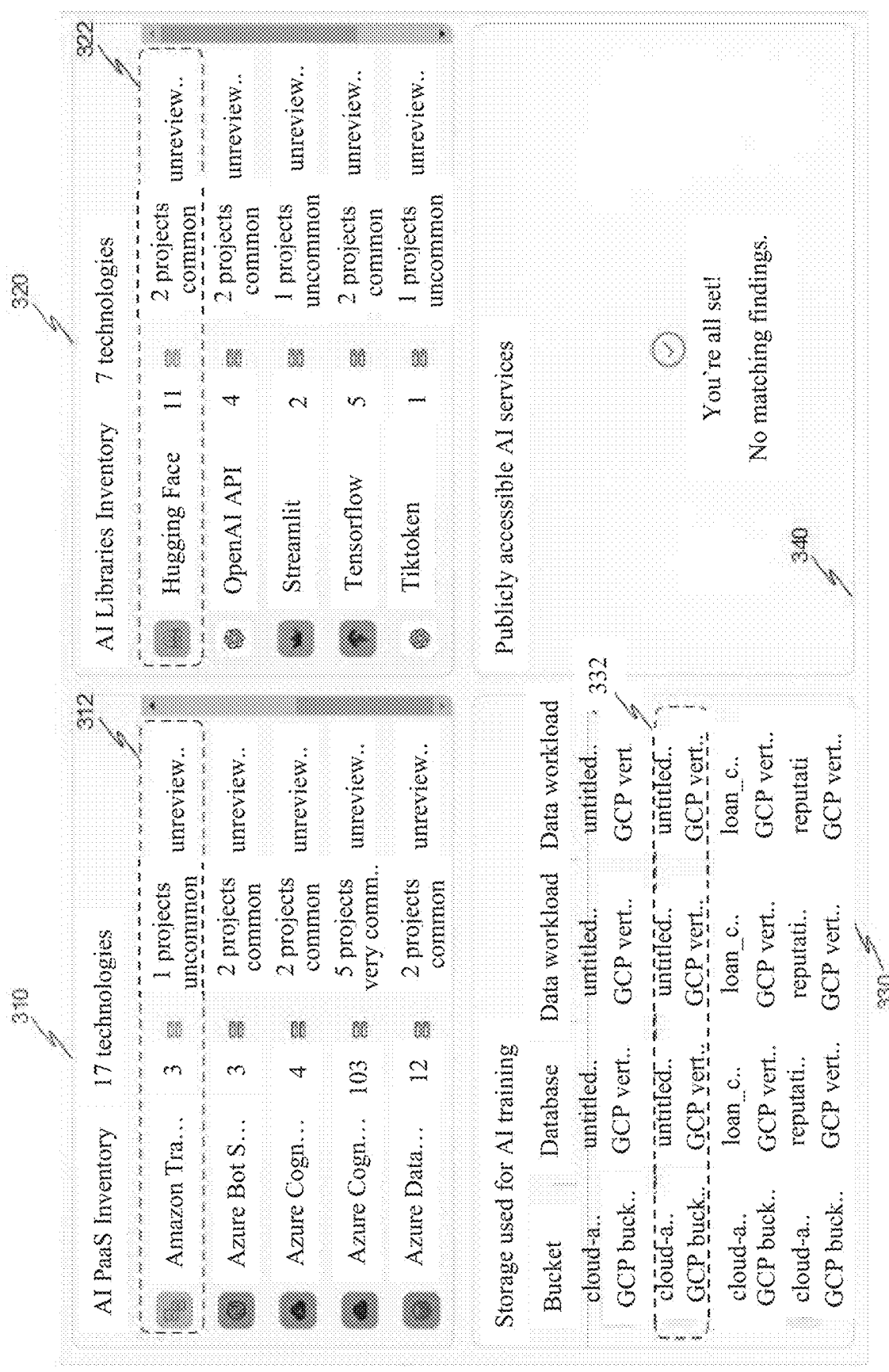
FIG. 3 is an example dashboard visualization showing an AI software bill of materials (SBOM), implemented in accordance with an embodiment.

FIG. 3 is an example dashboard visualization showing an AI software bill of materials (SBOM), implemented in accordance with an embodiment. In an embodiment, an AI SBOM is generated based on detection of a plurality of AI components deployed in a computing environments, in a combination of environments, etc.

For example, in an embodiment, an AI detector is configured to generate an AI SBOM based on data detected by an inspector. In some embodiments, an AI SBOM includes identifiers of software, an application, an endpoint, a storage device, a library, a binary, a SaaS application, a PaaS connection, a resource identifier, a principal identifier, a dataset identifier, a database identifier, combinations thereof, and the like.

In an embodiment, the dashboard includes an AI PaaS Inventory widget 310. In some embodiments, the AI PaaS Inventory widget 310 includes a plurality of rows, each row representing an AI PaaS connected to the computing environment. For example, a first row 312 includes a visual representation of an Amazon® Transcribe® service. In some embodiments, the AI PaaS inventory widget 310 includes representations of Azure® bot service, Azure cognitive services, and the like.

In certain embodiments, the dashboard includes an AI library inventory widget 320. In an embodiment, the AI library inventory widget includes various platforms, systems, libraries, and the like, which are accessible by the computing environment. For example, in an embodiment, a first row 322 includes a representation of Hugging Face®. In some embodiments, the AI library inventory widget includes representations of, for example, OpenAI® API, Streamlit, Google® Tensorflow®, Tiktoken, a combination thereof, and the like.

In an embodiment, the dashboard further includes a storage widget 330. In some embodiments, the storage widget 330 includes a visual representation of a storage device, storage service, and the like, utilized by a computing environment for AI applications, AI data, AI services, etc. For example, in an embodiment, a first row 332 represents a Google® Cloud Platform (GCP) bucket. In some embodiments, a bucket is utilized to store, for example, training data.

In certain embodiments, the dashboard includes an AI services widget 340. In some embodiments, the AI services widget 340 includes a visual representation of AI services which are publicly accessible (e.g., accessible from a network external to the computing environment, such as the Internet). In an embodiment, an AI service is determined to be a publicly accessible service in response to detecting an API endpoint associated with the AI service.

In certain embodiments, an AI detector is configured to detect an AI pipeline, and further to generate an AI dashboard based on the detected AI pipeline. In some embodiments, a widget of the AI dashboard is updated with data based on querying a representation of the AI pipeline, such as stored on a graph in a graph database, for example as discussed in more detail in FIG. 2 above.

Figure 4:
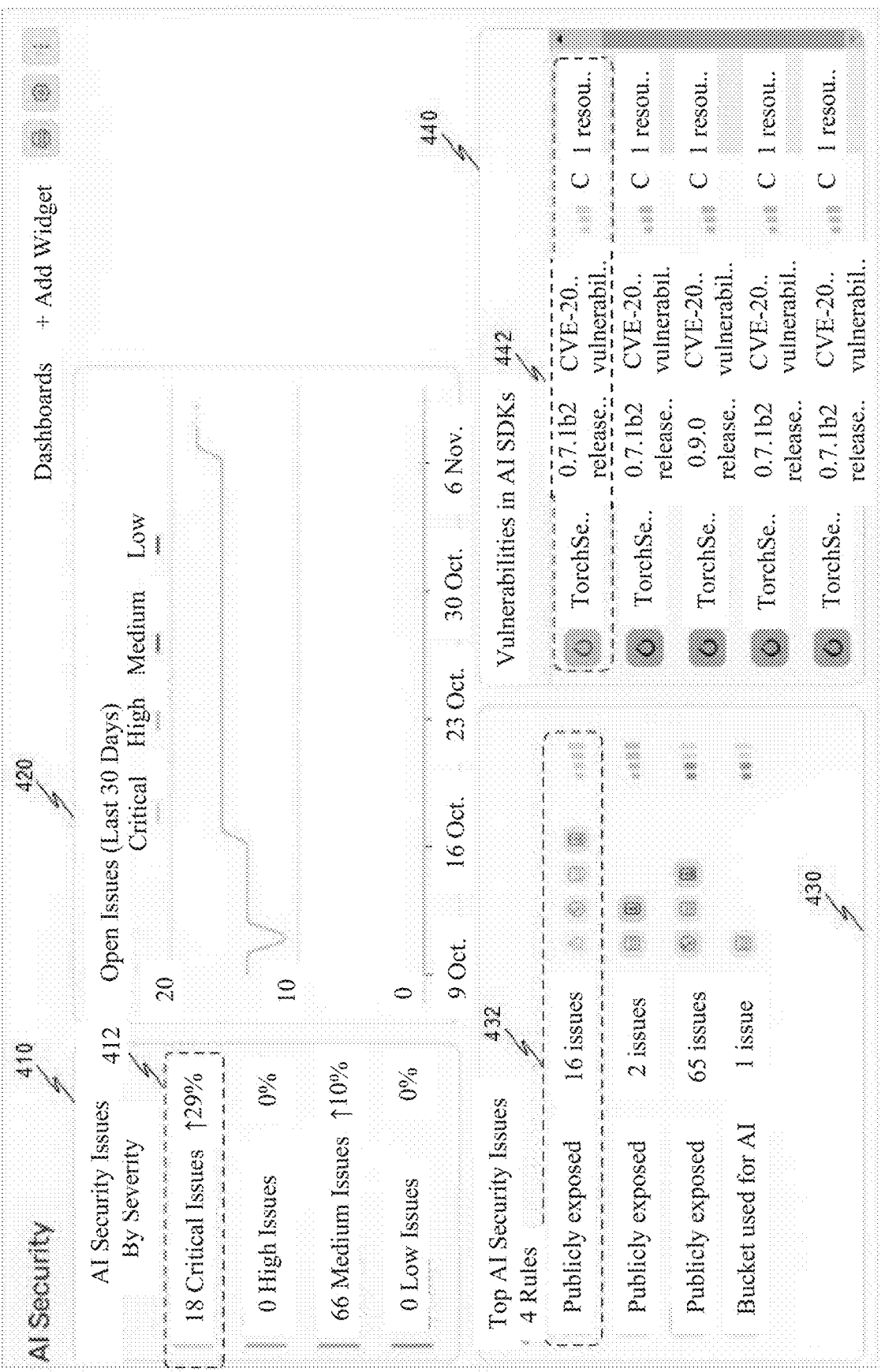
FIG. 4 is an example dashboard of an AI security posture management (SPM) dashboard visualization, implemented in accordance with an embodiment.

FIG. 4 is an example dashboard of an AI security posture management (SPM) dashboard visualization, implemented in accordance with an embodiment. In an embodiment, an AI SPM dashboard includes a plurality of widgets.

In an embodiment, a widget is updated, generated, and the like, based on a query executed on a security database.

In some embodiments, the AI SPM includes an AI security issue widget 410. In an embodiment, an AI security issue widget 410 includes a visual representation of aggregated security issues, group by severity. For example, according to an embodiment, the AI security issue widget 410 includes a row representing critical issues 412, which indicates that there are 18 critical issues associated with the AI pipeline. In some embodiments, a query is generated for a security database to detect a number of AI components which include a cybersecurity issue having a 'critical' severity rating.

In certain embodiments, the AI SPM dashboard includes a graph widget 420 including a visual representation of a number of open issues as a function of time. For example, in an embodiment, the graph widget 420 includes a total number of security issues detected with respect to the AI pipeline over a period of 30 days, per day.

In certain embodiments, a security database is queried to detect a total number of cybersecurity issues which are open issues (i.e., issues which have not been mitigated, remediated, etc.).

In an embodiment, the AI SPM dashboard further includes a pertinent security issues widget 430. In some embodiments, the pertinent security issues widget 430 includes a predetermined number of issues, a predetermined number of different issues, etc. which are detected in the AI pipeline, in components of the AI pipeline, and the like. For example, in an embodiment, a first row 432 indicates that there are a total of 16 issues related to a publicly exposed sensitive data. Sensitive data is an AI component, according to an embodiment, where the sensitive data is utilized in training an AI model.

In certain embodiments, the AI SPM dashboard further includes a vulnerabilities in AI SDKs widget 440. In some embodiments, the vulnerabilities in AI SDKs widget 440 includes visual representations of hosted technologies, for example which are detected by an inspector on a resource deployed in a computing environment.

For example, in an embodiment, a first row 442 indicates that an AI component of an AI pipeline includes a Torch-Serve® version with a vulnerability, where TorchServe is a software tool which allows serving PyTorch® models, which are machine learning models implemented in a Python® code. In some embodiments, an inspector is configured to detect a workload, detect that a TorchServe SDK is deployed on the detected workload, and further detect a PyTorch model. In an embodiment, each of the workload, the SDK, and the model, are AI components which are represented in an AI pipeline.

FIG. 5 is an example flowchart of a method for detecting an artificial intelligence software pipeline, implemented in accordance with an embodiment. In some embodiments, an AI pipeline is deployed across multiple computing environments, multiple accounts, utilizing multiple resources, principals, SaaS providers, PaaS provides, combinations thereof, and the like. It is therefore advantageous to generate a representation of the entire AI pipeline, including all components, in order to detect cybersecurity risks, mitigate cybersecurity issues, remediate cybersecurity exposures, exploited vulnerabilities, and the like.

At S510, a computing environment is inspected for an AI component. In an embodiment, an AI component is utilized by an AI system. For example, in certain embodiments, an AI model utilizes a storage for storing training data, a training workload utilized to train the AI model, an application for providing input to the trained model, an API to receive calls and utilize the application which utilizes the AI model, and API endpoint to connect the API to an external network, various combinations thereof, and the like. In this example, each such component is an AI component.

In an embodiment, an AI component is detected by an inspector configured to inspect a computing environment, such as a cloud computing environment, a hybrid computing environment, a networked computing environment, a combination thereof, and the like.

In some embodiments, an inspector is configured to detect a cybersecurity object, such as an application, an operating system, a nested workload, a certificate, a password, a cryptographic key, an identity, a library, a binary, a software development kit (SDK), a registry file, a combination thereof, and the like.

In certain embodiments, an inspector is configured to inspect a network of a computing environment (i.e., network inspection) and detect network components, such as firewalls, load balancers, gateways, endpoints, open ports, network paths (including, for example, TCP/IP communication, UDP communication, combinations thereof, and the like).

In some embodiments, an inspector is configured to inspect a cloud computing environment (e.g., cloud scanning) to detect various resources, principals, cloud entities, and the like, which are deployed in the cloud computing environment.

In an embodiment, an inspector is configured to perform static analysis of applications, of SDKs, of registry files, infrastructure as code (IaC) code objects, command line interface (CLI) inspection, a combination thereof, and the like. In some embodiments, the inspector is configured to detect AI components by performing such static analysis.

In certain embodiments, an AI detector is configured to query an identity and access management (IAM) service to detect identities, principals, user accounts, service accounts, roles, combinations thereof, and the like, which are utilized as AI components (i.e., in the AI pipeline). In an embodiment, an identity is determined to be utilized as an AI component in response to detecting a permission which authorizes the identity to act on another AI component (e.g., act on a resource of the AI pipeline).

In some embodiments, an identity is determined to be utilized as an AI component, and a further detection is performed to determine if the identity is authorized to access components, resources, and the like, which are not already identified as AI components.

For example, according to an embodiment, a first identity is determined to be utilized in an AI pipeline in response to determining that the first identity includes a permission to initiate an action in a cloud computing environment on a resource identified as an AI component. In an embodiment, the AI detector is configured to detect additional resources which the first identity has a permission to initiate an action thereupon. In some embodiments, the additional resources are further determined to be AI components.

In some embodiments, an AI detector is configured to determine if a component detected by the inspector is an AI component.

At S520, a connection is detected between AI components. In an embodiment, the connection is detected between a first AI component, and a second AI component. In some embodiments, the connection is detected in response to detecting a shared resource that both AI components act on. In certain embodiments, a connection is detected by querying an IAM service to detect resources which a principal (determined to be an AI component) is authorized to act on.

In an embodiment, an AI detector is configured to detect a connection between AI components, based on, for example, a result of an inspector performing inspection in a computing environment.

In some embodiments, the AI detector is configured to detect a connection between a first AI component deployed in a first computing environment (e.g., a production environment), and a second AI component deployed in a second computing environment (e.g., a development environment).

At S530, a representation is generated in a security database. In an embodiment, a representation is generated for each of: the first AI component, for the second AI component, the connection, etc. In some embodiments, a representation is generated based on a unified data model, such that a resource detected in a first computing environment is represented using the same model as a resource detected in a second computing environment which is different than the first computing environment.

In certain embodiments, the security database is implemented as a graph database, such as a Neo4j® database. In an embodiment, a representation is stored as a node in the graph database. In some embodiments, a relationship between a first AI component and a second AI component, is represented as a connection between representations, e.g., a connection between nodes.

At S540, an AI pipeline is generated. In an embodiment, the AI pipeline includes a representation of an AI pipeline, such as a visual representation. In some embodiments, the AI pipeline includes a plurality of AI components, and the connections between such AI components.

In an embodiment, an AI pipeline includes any of: a cybersecurity finding, a representation of an API endpoint, a representation of an application, a representation of an AI model, a representation of a function, a representation of a virtualization, a representation of a training job, a representation of a training dataset, a representation of a secret, a representation of a computing environment, a representation of an account, a representation of a data, a representation of a data type, any combination thereof, and the like.

In an embodiment, generating an AI pipeline includes generating a visual representation, including a corresponding graphic for each data representation of an AI component, and a graphic representing connections between the different graphics. A visual representation of an AI pipeline is discussed in more detail with respect to FIG. 2, which is an example of one such visual representation.

In some embodiments, it is advantageous to generate a visual representation of an AI pipeline, as AI applications are often deployed across multiple computing environments, include multiple external software providers (e.g., SaaS and PaaS providers), etc.

In certain embodiments, an AI detector is further configured to detect cybersecurity risks based on detecting a plurality of AI components, and further based on detecting a connection between a plurality of AI components.

Figure 6:
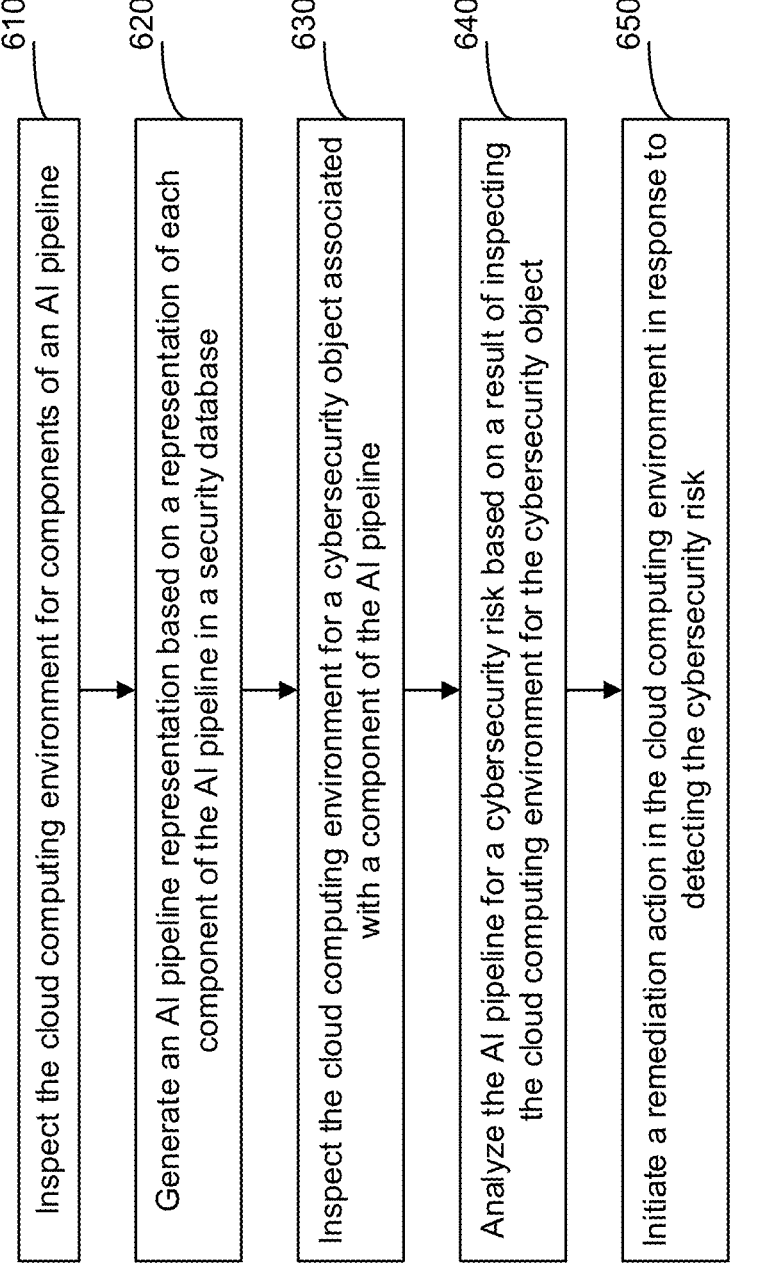
FIG. 6 is an example flowchart of a method for determining artificial intelligence (AI) security posture management (SPM), implemented according to an embodiment.

FIG. 6 is an example flowchart of a method for determining artificial intelligence (AI) security posture management (SPM), implemented according to an embodiment. In an embodiment, AI SPM includes generating an AI pipeline including AI components across multiple computing environments, and modeling cybersecurity risks, misconfigurations, malware, exposures, vulnerabilities, exploitations, combinations leading to increased risk (e.g., toxic combinations), combinations thereof, and the like.

At S610, components are detected of an AI pipeline. In an embodiment, a computing environment is inspected to detect the components. In some embodiments, the computing environment is a cloud computing environment, a hybrid computing environment, a networked computing environment, various combinations thereof, and the like. For example, in an embodiment, the computing environment of an AI pipeline includes multiple computing environments, such as a production environment, a development environment, a training environment, etc. In an embodiment, each computing environment is implemented using the same account, a different account, etc. In some embodiments, a first computing environment is implemented on a first virtual private cloud (VPC), a second computing environment is implemented on a second VPC, etc.

In an embodiment, an AI component is detected by an inspector configured to inspect a computing environment, such as a cloud computing environment, a hybrid computing environment, a networked computing environment, a combination thereof, and the like.

In some embodiments, an inspector is configured to detect a cybersecurity object, such as an application, an operating system, a nested workload, a certificate, a password, a cryptographic key, an identity, a library, a binary, a software development kit (SDK), a registry file, a combination thereof, and the like.

In certain embodiments, an inspector is configured to inspect a network of a computing environment (i.e., network inspection) and detect network components, such as firewalls, load balancers, gateways, endpoints, open ports, network paths (including, for example, TCP/IP communication, UDP communication, combinations thereof, and the like).

In some embodiments, an inspector is configured to inspect a cloud computing environment (e.g., cloud scanning) to detect various resources, principals, cloud entities, and the like, which are deployed in the cloud computing environment.

In an embodiment, an inspector is configured to perform static analysis of applications, of SDKs, of registry files, infrastructure as code (IaC) code objects, command line interface (CLI) inspection, a combination thereof, and the like. In some embodiments, the inspector is configured to detect AI components by performing such static analysis.

In certain embodiments, an AI detector is configured to query an identity and access management (IAM) service to detect identities, principals, user accounts, service accounts, roles, combinations thereof, and the like, which are utilized as AI components (i.e., in the AI pipeline). In an embodiment, an identity is determined to be utilized as an AI component in response to detecting a permission which authorizes the identity to act on another AI component (e.g., act on a resource of the AI pipeline).

In some embodiments, an identity is determined to be utilized as an AI component, and a further detection is performed to determine if the identity is authorized to access components, resources, and the like, which are not already identified as AI components.

For example, according to an embodiment, a first identity is determined to be utilized in an AI pipeline in response to determining that the first identity includes a permission to initiate an action in a cloud computing environment on a resource identified as an AI component. In an embodiment, the AI detector is configured to detect additional resources which the first identity has a permission to initiate an action thereupon. In some embodiments, the additional resources are further determined to be AI components.

In some embodiments, an AI detector is configured to determine if a component detected by the inspector is an AI component.

At S620, an AI pipeline is generated. In an embodiment, the AI pipeline includes a representation of an AI pipeline, such as a visual representation. In some embodiments, the AI pipeline includes a plurality of AI components, and the connections between such AI components.

In an embodiment, an AI pipeline includes any of: a cybersecurity finding, a representation of an API endpoint, a representation of an application, a representation of an AI model, a representation of a function, a representation of a virtualization, a representation of a training job, a representation of a training dataset, a representation of a secret, a representation of a computing environment, a representation of an account, a representation of a data, a representation of a data type, any combination thereof, and the like.

In an embodiment, generating an AI pipeline includes generating a visual representation, including a corresponding graphic for each data representation of an AI component, and a graphic representing connections between the different graphics. A visual representation of an AI pipeline is discussed in more detail with respect to FIG. 2, which is an example of one such visual representation.

In some embodiments, it is advantageous to generate a visual representation of an AI pipeline, as AI applications are often deployed across multiple computing environments, include multiple external software providers (e.g., SaaS and PaaS providers), etc.

In certain embodiments, an AI detector is further configured to detect cybersecurity risks based on detecting a plurality of AI components, and further based on detecting a connection between a plurality of AI components.

At S630, a computing environment is inspected to detect a cybersecurity object. In an embodiment, an AI component deployed in the computing environment is inspected to detect the cybersecurity object deployed thereon. For example, according to an embodiment, the cybersecurity object is an SDK, a library, a binary, a registry file, a certificate, a secret, a cryptographic key, a credential, a software, an operating system, a code object, an IaC code object, a malware, a data, a sensitive data, a combination thereof, and the like.

In certain embodiments, the computing environment is inspected to detect an AI component, an AI component version, an identity associated with an AI component, combinations thereof, and the like.

At S640, the AI pipeline is analyzed to detect a cybersecurity risk. In an embodiment, the cybersecurity risk is detected based on the detected cybersecurity object. In some embodiments, analyzing an AI pipeline includes applying policies, rules, conditions, and the like, to the AI pipeline, to components of the AI pipeline, to connections between components of the AI pipeline, combinations thereof, and the like.

In certain embodiments, a cybersecurity object indicates a cybersecurity threat, a cybersecurity risk, a vulnerability, a misconfiguration, an exposure, an exploitation, a combination thereof, and the like. In some embodiments, a plurality of cybersecurity objects, a cybersecurity object and an AI component, etc., indicate together a cybersecurity threat, a cybersecurity risk, a vulnerability, a misconfiguration, an exposure, an exploitation, a combination thereof, and the like. According to an embodiment, this is referenced to as a toxic combination.

In some embodiments, a first cybersecurity object is detected in a first computing environment, and a second cybersecurity object is detected in a second computing environment. In certain embodiments, each cybersecurity object on its own does not pose a risk, but when combined in a single AI pipeline, the plurality of cybersecurity objects together are a toxic combination, leading to a cybersecurity risk.

For example, a secret stored in a development environment is a cybersecurity object which does not pose a risk, as the development environment in itself is not publicly exposed. However, a publicly exposed assistant deployed in a production environment with a function or message that contain the secret, is a toxic combination which indicates a cybersecurity risk.

In certain embodiments, analyzing the AI pipeline includes performing data flow and data leakage analysis. For example, in an embodiment, data flow includes detecting a path between a data file, and utilization of data stored in the data file by an AI model. In an embodiment, an AI model utilizes a data file when the model accesses the data thereon, such as by training using the data, by generating a response based on the data, by generating a prompt based on the data, etc.

In some embodiments, analyzing the AI pipeline includes performing dynamic model inspection. For example, in an embodiment, a dynamic model inspector is configured to inject an AI model, an AI application, and the like, with prompts, inputs, and the like, generated to expose sensitive data, reveal a system prompt, accessing, copying, or otherwise downloading the AI model, and the like.

According to an embodiment, analyzing the AI pipeline includes utilizing a lateral movement detector. For example, in an embodiment, a lateral movement detector is configured to inject a prompt aimed at generating an insecure output handling.

For example, in an embodiment, an AI application utilizing an AI model which is misconfigured, or includes excessive permissions in an environment, is vulnerable to generating outputs which when executed cause cross site scripting (XSS) attacks, cross site request forgery (CSRF) attacks, server-side request forgery (SSRF) attacks, privilege escalation, remote code execution, combinations thereof, and the like.

In some embodiments, analyzing the AI pipeline includes determining a vulnerability to training data utilized by an AI model, by an AI application, etc. For example, in an embodiment, vulnerable training data, e.g., stored in a publicly accessible bucket, is a cybersecurity risk which can lead to training data poisoning, thereby introducing an unwanted bias in responses generated by the AI application when utilizing the AI model trained on poisoned data.

In certain embodiments, analyzing the AI pipeline for a cybersecurity risk further includes determining if an AI application provides a model with a resource-intensive prompt. For example, according to an embodiment, an AI model is susceptible to a denial of service attack, which occurs when an AI application receives through an API endpoint a prompt which is resource intensive. It is therefore desirable that the AI application blocks such resource intensive prompts.

In some embodiments, an AI detector is configured to provide an AI application with a prompt from a predefined list of prompts which, if executed by an AI model, causes a resource-heavy operation to occur. A resource heavy operation is taxing on processing power, memory, or both, according to an embodiment. In certain embodiments, the prompt is selected based on a type which is determined respective of the AI model.

In an embodiment, analyzing the AI pipeline for a cybersecurity risk includes detecting a misconfiguration in an AI component of the AI pipeline. For example, in an embodi-ment, a misconfiguration is detected by an inspector on a plugin of an AI application. In some embodiments, the misconfiguration is related to a weakness in a code object, a weakness in an AI model, a misconfigured identity, a misconfigured data store, a misconfigured repository, a combination thereof, and the like.

In some embodiments, detecting a misconfiguration includes comparing a finding by an inspector (e.g., a result of inspecting a workload) to a predetermined rule related to a configuration (i.e., a configuration rule).

In certain embodiments, an AI application is configured to receive a plugin which provides additional functions on top of the AI application. In some embodiments, a misconfig-ured plugin allows insecure inputs to be received by the AI application, which pose a cybersecurity risk. In some embodiments, an AI application is misconfigured to provide a plugin thereof with excessive access, excessive permissions, etc.

According to an embodiment, analyzing the AI pipeline for a cybersecurity risk includes detecting a lateral move-ment path between an AI component of the AI pipeline and another component of a computing environment. For example, in an embodiment, a lateral movement path is detected where an LLM is misconfigured, for example, to initiate an action in a computing environment which would grant unintended access to another component of the com-puting environment. In certain embodiments, a movement path can occur between tenants utilizing the same model, which is further undesirable.

In some embodiments, analyzing the AI pipeline for a cybersecurity risk includes inspecting infrastructure as code (IaC) for cybersecurity objects, inspecting command line interfaces (CLIs) for cybersecurity objects, and the like.

In certain embodiments, analyzing the AI pipeline for a cybersecurity risk includes initiating an attack path analysis on the AI pipeline. In an embodiment, an attack path analysis is generated for each AI component of the AI pipeline. In some embodiments, an attack path is a network path, or reachability path, which is generated by inspecting a com-puting environment and detecting objects therein, such that the reachability path includes all network objects between an endpoint and an AI component.

For example, according to an embodiment, a network path includes an endpoint, a gateway, a firewall, a load balancer, a virtual machine, a network communication port (e.g., a TCP/IP port), an IP address, a domain name, various com-binations thereof, and the like. In some embodiments, an attack path further includes a vulnerability, an identity, a network exposure, a malware, a data, an exposed secret, a combination thereof, and the like.

In certain embodiments, analyzing the AI pipeline for a cybersecurity risk includes generating a call to a PaaS provider, a SaaS provider, and the like. For example, in an embodiment, an OpenAI® API endpoint is queried to fetch data and metadata based on an identifier (e.g., of an orga-nization). In some embodiments, the data and metadata include a list of GPTs, a list of actions, a list of assistants, a list of functions, a list of model, a list of files, a list of training datasets, a list of documents, identifier of training jobs, identifiers of threads, messages, runs, combinations thereof, and the like.

At S650, a remediation action is initiated. In an embodi-ment, the remediation action is initiated based on the detected cybersecurity object, the cybersecurity risk, a com-bination thereof, and the like. In some embodiments, a remediation action is represented on the security database, for example as a node in a security graph. In certain embodiments, a representation of a remediation action is connected to a node representing a cybersecurity risk which the remediation action remediates when executed in the computing environment.

In an embodiment a remediation action includes a mitigation action. In some embodiments, a remediation action includes generating an alert, generating a notification, generating a ticket in a ticketing system, updating an alert, updating a notification, updating a ticket, closing a first ticket and opening a second ticket, clearing a first alert and generating a second alert, initiating an action in the computing environment, revoking access to a workload, revoking access from a workload, revoking access to a principal, revoking access from a principal, sandboxing a workload, removing a code object, applying a software patch, configuring a firewall to filter network traffic to a resource, configuring a firewall to filter network traffic from a resource, configure an IAM service to revoke a token, a combination thereof, and the like.

In some embodiments, the mitigation action includes removing an attack path. For example, in an embodiment, removing the attack path includes initiating an action listed above.

According to an embodiment, a remediation action includes model runtime protection. For example, in an embodiment, a suspicious user session is detected. In certain embodiments, a suspicious user session is detected based on a log of activity, including anomaly detection, activity related to specific actions, combinations thereof, and the like.

For example, in an embodiment, a user session is determined to be suspicious in response to detecting from an activity log that the user is attempting to access the system prompt. In other embodiments, a user session is determined to be suspicious in response to detecting that the user is attempting to access, request, and the like, sensitive data.

Figure 7:
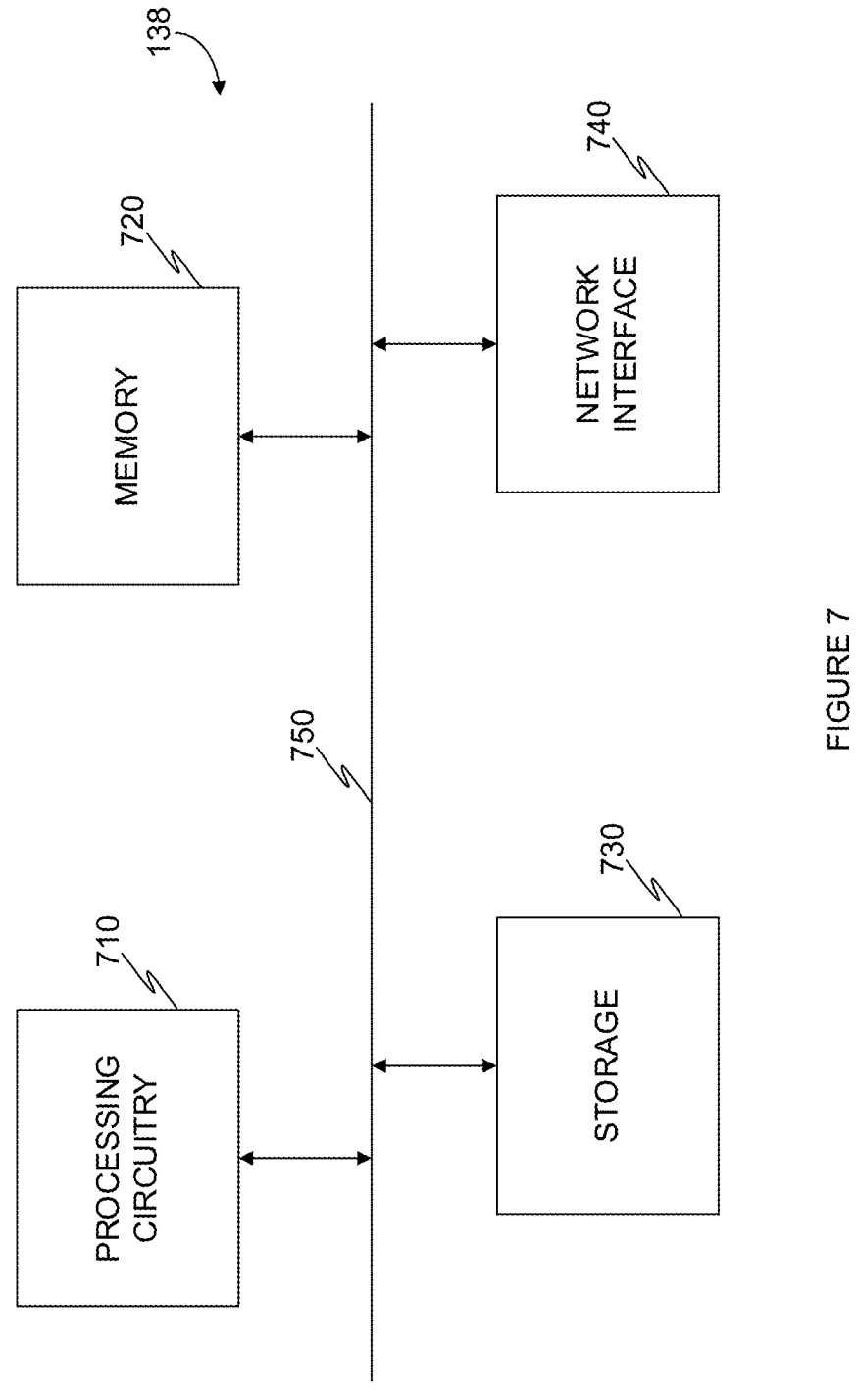
FIG. 7 is an example schematic diagram of an AI detector according to an embodiment.

FIG. 7 is an example schematic diagram of an AI detector 138 according to an embodiment. The AI detector 138 includes a processing circuitry 710 coupled to a memory 720, a storage 730, and a network interface 740. In an embodiment, the components of the AI detector 138 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the AI detector 138 with communication with, for example, the inspector 132, the inspection controller 134, the security database 136, and the like.

It should be understood that the embodiments described herein are not limited to the specific architecture illustrated in FIG. 7, and other architectures may be equally used without departing from the scope of the disclosed embodiments.

Furthermore, in certain embodiments the inspector 132, the inspection controller 134, the security database 136, and the like, may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining an artificial intelligence (AI) security posture management (SPM) of a cloud computing environment, comprising:
    inspecting, using an inspector in an inspection environment, the cloud computing environment for components of an AI pipeline;
    generating an AI pipeline representation based on a representation of each component of the AI pipeline in a security database;
    inspecting, using an inspector in an inspection environment, the cloud computing environment for a cybersecurity object associated with a component of the AI pipeline, wherein the cloud computing environment is a production environment distinct from any inspection environment and any inspector is a workload in an inspection environment;
    analyzing the AI pipeline for a cybersecurity risk based on a result of inspecting the cloud computing environment for the cybersecurity object;
    detecting a principal deployed in the cloud computing environment as a component of the AI pipeline;
    detecting a permission associated with the principal through an identity and access management (IAM) service;
    determining that the principal includes excessive permissions, based on the detected permission; and
    initiating a remediation action in the cloud computing environment in response to detecting the cybersecurity risk and the excessive permissions.

2. The method of claim 1, further comprising:
analyzing the AI pipeline for a combined cybersecurity risk based on detecting a cybersecurity object and a component of the AI pipeline.

3. The method of claim 2, wherein the cybersecurity object is a sensitive data, and the component of the AI pipeline is an exposed workload.

4. The method of claim 1, further comprising:
    detecting the cybersecurity risk based on a combination of secondary cybersecurity risks.

5. The method of claim 1, further comprising:
    detecting a database in the AI pipeline;
    determining that the detected database includes sensitive data; and
    generate an alert based on the sensitive data.

6. The method of claim 1, further comprising:
    detecting a misconfiguration on a component of the AI pipeline; and
    initiating a remediation based on the detected misconfiguration.

7. The method of claim 1, further comprising:
    detecting an AI model stored on a component of the AI pipeline;
    determining that the AI model is associated with a cybersecurity risk; and
    initiating a remediation based on the cybersecurity risk.

8. The method of claim 7, further comprising:
    determining that the AI model is vulnerable to a prompt injection, based on the associated cybersecurity risk.

9. The method of claim 7, further comprising:
    detecting that an output of the AI model is directed to a predetermined sensitive system, the sensitive system being a component of the AI pipeline;
    determining that the AI model is configured to generate an executable instruction; and
    determining that the AI model is vulnerable to an output handling, in response to determining that the AI model is configured to generate the executable instruction.

10. The method of claim 1, further comprising:
    detecting a secret in a component of the AI pipeline; and
    generating a cybersecurity risk assessment based on the detected secret.

11. The method of claim 1, further comprising:
    detecting a potential attack path to a component of the AI pipeline.

12. The method of claim 11, further comprising:
    detecting a network path between an external network and the component of the AI pipeline; and
    detecting the potential attack path based on the network path.

13. The method of claim 1, further comprising:
    configuring the inspector that is inspecting the cloud computing environment for a cybersecurity object associated with a component of the AI pipeline to inspect the component of the AI pipeline for any one of: a vulnerability, an identity, a network exposure, a malware, a sensitive data, a secret, and any combination thereof.

14. The method of claim 1, wherein the inspector that is inspecting the cloud computing environment for components of an AI pipeline detects AI components by performing static analysis.

15. The method of claim 1, wherein the cloud computing environment includes at least two different cloud computing environments and wherein at least two of the components of the AI pipeline are deployed in different ones of the at least two cloud computing environments.

16. The method of claim 1, wherein inspecting for a cybersecurity object further comprises:
    causing creation of a clone disk; and
    Inspecting the clone disk for the cybersecurity object.

17. A non-transitory computer-readable medium storing a set of instructions for determining an artificial intelligence (AI) security posture management (SPM) of a cloud computing environment, the set of instructions comprising:
    one or more instructions that, when executed by one or more processors of a device, cause the device to:
    inspect, using an inspector in an inspection environment, the cloud computing environment for components of an AI pipeline;
    generate an AI pipeline representation based on a representation of each component of the AI pipeline in a security database;
    inspect, using an inspector in an inspection environment, the cloud computing environment for a cybersecurity object associated with a component of the AI pipeline, wherein the cloud computing environment is a production environment distinct from any inspection environment and any inspector is a workload in an inspection environment;

analyze the AI pipeline for a cybersecurity risk based on a result of inspecting the cloud computing environment for the cybersecurity object;

detect a principal deployed in the cloud computing environment as a component of the AI pipeline;

detect a permission associated with the principal through an identity and access management (IAM) service;

determine that the principal includes excessive permissions, based on the detected permission; and initiate a remediation action in the cloud computing environment in response to detecting the cybersecurity risk and the excessive permissions.

18. A system for determining an artificial intelligence (AI) security posture management (SPM) of a cloud computing environment comprising:

a processing circuitry;

a memory, the memory containing instructions that, when executed by the processing circuitry, configure the system to:

inspect, using an inspector in an inspection environment, the cloud computing environment for components of an AI pipeline;

generate an AI pipeline representation based on a representation of each component of the AI pipeline in a security database;

inspect, using an inspector in an inspection environment, the cloud computing environment for a cybersecurity object associated with a component of the AI pipeline, wherein the cloud computing environment is a production environment distinct from any inspection environment and any inspector is a workload in an inspection environment;

analyze the AI pipeline for a cybersecurity risk based on a result of inspecting the cloud computing environment for the cybersecurity object;

detect a principal deployed in the cloud computing environment as a component of the AI pipeline;

detect a permission associated with the principal through an identity and access management (IAM) service;

determine that the principal includes excessive permissions, based on the detected permission; and initiate a remediation action in the cloud computing environment in response to detecting the cybersecurity risk and the excessive permissions.

19. The system of claim 18, wherein the memory contains further instructions which when executed by the processing circuitry further configure the system to:

analyze the AI pipeline for a combined cybersecurity risk based on detecting a cybersecurity object and a component of the AI pipeline.

20. The system of claim 19, wherein the cybersecurity object is a sensitive data, and the component of the AI pipeline is an exposed workload.

21. The system of claim 18, wherein the memory contains further instructions which when executed by the processing circuitry further configure the system to:

detect the cybersecurity risk based on a combination of secondary cybersecurity risks.

22. The system of claim 18, wherein the memory contains further instructions which when executed by the processing circuitry further configure the system to:

detect a database in the AI pipeline;

determine that the detected database includes sensitive data; and generate an alert based on the sensitive data.

23. The system of claim 18, wherein the memory contains further instructions which when executed by the processing circuitry further configure the system to:

detect a misconfiguration on a component of the AI pipeline; and initiate a remediation based on the detected misconfiguration.

24. The system of claim 18, wherein the memory contains further instructions which when executed by the processing circuitry further configure the system to:

detect an AI model stored on a component of the AI pipeline;

determine that the AI model is associated with a cybersecurity risk; and initiate a remediation based on the cybersecurity risk.

25. The system of claim 24, wherein the memory contains further instructions which when executed by the processing circuitry further configure the system to:

determine that the AI model is vulnerable to a prompt injection, based on the associated cybersecurity risk.

26. The system of claim 24, wherein the memory contains further instructions which when executed by the processing circuitry further configure the system to:

detect that an output of the AI model is directed to a predetermined sensitive system, the sensitive system being a component of the AI pipeline;

determine that the AI model is configured to generate an executable instruction; and determine that the AI model is vulnerable to an output handling, in response to determining that the AI model is configured to generate the executable instruction.

27. The system of claim 18, wherein the memory contains further instructions which when executed by the processing circuitry further configure the system to:

detect a secret in a component of the AI pipeline; and generate a cybersecurity risk assessment based on the detected secret.

28. The system of claim 18, wherein the memory contains further instructions which when executed by the processing circuitry further configure the system to:

detect a potential attack path to a component of the AI pipeline.

29. The system of claim 28, wherein the memory contains further instructions which when executed by the processing circuitry further configure the system to:

detect a network path between an external network and the component of the AI pipeline; and detect the potential attack path based on the network path.

30. The system of claim 18, wherein the memory contains further instructions which when executed by the processing circuitry further configure the system to:

configure the inspector that is inspecting the cloud computing environment for a cybersecurity object associated with a component of the AI pipeline to inspect the component of the AI pipeline for any one of:

a vulnerability, an identity, a network exposure, a malware, a sensitive data, a secret, and any combination thereof.

*    *    *    *    *